US006076470A

United States Patent [19]
Koch

[11] Patent Number: 6,076,470
[45] Date of Patent: Jun. 20, 2000

[54] CENTRAL FRAME OF A CONNECTING CORRIDOR BELLOWS SUBDIVIDED IN TWO HALVES

[75] Inventor: Robert Koch, Bad Sooden-Allendorf, Germany

[73] Assignee: Hubner Gummi-Und Kunststoff GmbH, Kassel, Germany

[21] Appl. No.: 09/067,154

[22] Filed: Apr. 27, 1998

Related U.S. Application Data

[63] Continuation of application No. PCT/DE97/00897, May 2, 1997.

[30] Foreign Application Priority Data

May 3, 1996 [DE] Germany ............................. 196 17 903
May 31, 1996 [DE] Germany ............................. 196 21 913

[51] Int. Cl.[7] .................................................. B60D 5/00
[52] U.S. Cl. ................................ 105/8.1; 105/14; 105/15; 105/17; 105/18
[58] Field of Search .................................. 105/8.1, 14, 15, 105/17, 18, 20, 21, 16, 396, 397; 296/178, 208

[56] References Cited

U.S. PATENT DOCUMENTS 2,931,317  4/1960  Hunt ........................................ 105/14
4,477,099  10/1984  Luyckx .................................... 105/18

FOREIGN PATENT DOCUMENTS

0614797A1  3/1994  European Pat. Off. .

*Primary Examiner*—S. Joseph Morano
*Assistant Examiner*—Robert J. McCarry, Jr.
*Attorney, Agent, or Firm*—Thomas R. Vigil

[57] ABSTRACT

The subdivided bellows of a connecting element is provided between two articulated vehicle components. The halves of the bellows are coupled at their ends to a vehicle component, and a middle frame (1) has a device for guiding supply lines (100), e.g. tubes, cables, etc., in a ceiling area of the connecting element which is movable relative to the middle frame (1).

24 Claims, 8 Drawing Sheets

CENTRAL FRAME OF A CONNECTING CORRIDOR BELLOWS SUBDIVIDED IN TWO HALVES

This is a com of PCT/DE97/00897 filed May 20, 1997.

BACKGROUND OF THE INVENTION

1. Field of the Invention

The invention relates to a central frame of a connecting corridor bellows subdivided in two halves, the corridor being positioned between two vehicle parts hinged to each other, whereas the bellows halves can be arranged by their end part onto a vehicle part.

2. Description of the Prior Art

A connecting corridor between two interconnected vehicle parts of a vehicle is known; hereby, the connecting corridor usually consists of an intercommunicating gangway covered by a bellows or a concertina walls. The two vehicle parts are moreover linked together by means of a joint, whereas parts of the connecting corridor are supported by this joint.

DE-B 1207220 discloses a central frame of a bellows between two vehicle parts hinged to each other according to the characteristics of the preamble and being particularly provided with bellows ends hinged at their end to the vehicle parts. In the prior art, supply lines, as for example cable conduits, lines for supplying the heating facilities and the compressed-air, electro-lines and, if necessary, lines for air-conditioning, are guided through the floor of such an articulated vehicle. Due to the engineering of low-platform busses having a floor level of only 400 mm, such supply lines cannot be guided in the floor any more since there is lack of space. Therefore, such supply lines are usually guided on one side of the connecting corridor. When turning the joint by more than 50 degrees, it becomes apparent that these supply lines can not be guided with accuracy, so that it comes to failures due to rupture and contusions, often entailing costly repairs.

SUMMARY OF THE INVENTION

The object of the invention is therefore to provide a device for guiding supply lines as mentioned above which allows to avoid the said disadvantages.

Such a device is characterized according to the invention in that the central frame located in the ceiling area of the connecting corridor is provided with a device for guiding supply lines, as conduits, cables and the like, this device being movable relative to the central frame. The absolute height of the busses, for example in low-platform busses, proved to remain the same, only the floor level being lowered. This means that the free headroom in such a low-platform bus is higher than needed. Accordingly, the roof area offers enough space for guiding the supply lines between two vehicle parts of an articulated vehicle. Thanks to the device according to the invention the supply lines can be guided even in sharp curves without any risk of getting damaged.

A first embodiment is particularly characterized in that the device in the roof area is provided with at least one cradle receiving the supply lines, whereas the cradle is movably arranged in the central frame transversely to the longitudinal axis of the vehicle. The cradle advantageously is provided with a carrier having several borings through which the supply lines are passed; the carrier is thereby receivable by the cradle so that it can rotate around a vertical axis. The advantage of such a rotatable carrier is that the strain exerted on the cradle by rigid supply lines during corresponding movements of the cradle in the central frame are reduced, since the strain is weakened by the rotation of the carrier.

It has more particularly been foreseen that the vertically running braces of the central frame are interconnected by a guiding rail for the cradle. This makes it clear that the roof area in the area of the connecting corridor of such a vehicle is disconnected, allowing thus a supplementary sound insulation and air-conditioning in the roof of the bellows. Moreover, the guiding of the lines in the roof area considerably reduces the costs, since the majority of all supply lines use to be guided through the roof up to the connecting corridor. Thus, it is no more necessary to use the complicated method known in prior art consisting in laying the supply lines along the string pieces of a vehicle part downwards and upwards again on the other side of the adjacent vehicle part.

According to a particular characteristic of the invention, the cradle is restrictedly guided in the guiding rail. This measure guarantees that the supply lines are always taking the best position independently from the movements of the two vehicle parts relative to each other, so that the supply lines cannot be damaged. For the restricted guidance of the cradle, the cradle is hingeable to at least one vehicle part by means of at least one guiding member. The cradle is preferably connected with each vehicle part by a guiding member though, whereas the guiding member is advantageously designed as a rod, hinged to the vehicle part as well as to the cradle. The cradle is hereby guided in the guiding rail eccentrically to the central longitudinal axis of the vehicle; the guiding member designed as a rod is fastened onto the vehicle in the central longitudinal axis of the vehicle. Thanks to this measure, not only the cradle itself for the reception of the cables is guided, but the central frame too is stabilized, which is of considerable advantage.

The central frame is particularly stabilized when the guiding rail is provided with two cradles being each arranged out of the central axis of the vehicle in the guiding rail, and when each cradle is connectable with the two vehicle parts by means of two guiding members per cradle. Such a construction is particularly advantageous when stay bars are to be arranged in the area of the central frame in the connecting corridor and when the central frame is stabilized in its position without any further supports. Such a free suspension of the central frame according to prior art made it possible for vandals or for careless passengers to dislodge the central frame, bringing it to swing by hand force, which entails the destruction of the bellows in the long run. Thanks to the arrangement of two cradles in the guiding rail, whereas each cradle is connected with each vehicle part by a guiding member, any further stabilization of the central frame can be forgone, even in case stay bars are arranged on the central frame.

In order to guarantee a good guiding of the cradle or cradles in the guiding rail, the guiding rail receives the cradle form-fittingly but movably along the guiding rail.

In a preferred embodiment, the guiding member has a joint. In extreme cornering, the path of the cradle in the central frame or in the guiding rail resp. proved to be insufficient to take such sharp curves without damaging the guiding members. By arranging a joint in the guiding member, the guiding member can buckle towards the guiding rail. In order to avoid that the guiding member buckles outwards by an overstretched angle of more than 180°, the joint is provided with a corresponding stopper. Moreover, a recuperating member is arranged in the area of the joint on the central frame and here more particularly on the guiding rail. This recuperating member, which is preferably fastenable on the guiding rail in the central longitudinal axis of the vehicle, ensures that, before buckling, the joint is pulled out of the dead center position, i.e. of an angle of 180° or more into the buckling position, i.e. into an angle of less than 180°. The recuperating member is adjustable in length for a more accurate adjustment of the joint. That means that, thanks to the adjustability of the length of the recuperating member rotatably fastened on the central frame or on the guiding rail, the engaging time can be determined.

A second embodiment of the device according to the invention is characterized in that the central frame is provided with a horizontally running bow that receives a swivel arm so that it is pivotable in horizontal direction, whereas the swivel arm has holding devices at its end. This device also makes it possible to guide the supply lines even while taking sharp curves.

According to a preferred characteristic of the device, the holding devices are pivotably receivable by the swivel arm. During cornering, the device is moved like a parallelogram guiding rod. The device is essentially moved by the movement of the supply lines themselves, their movement being occasioned by the buckling movement of the two vehicle parts during cornering.

The swivel arm can particularly be arranged on the central frame in the central longitudinal axis of the vehicle. Thus, by arranging the swivel arm in the neutral axis of the vehicle, the supply lines can best be guided both in right-hand and in left-hand curves. The holding devices are provided with openings for receiving the supply lines.

BRIEF DESCRIPTION OF THE DRAWINGS

The invention is explained in more details according to the drawings.

DESCRIPTION OF THE PREFERRED EMBODIMENT(S)

Figure 1:
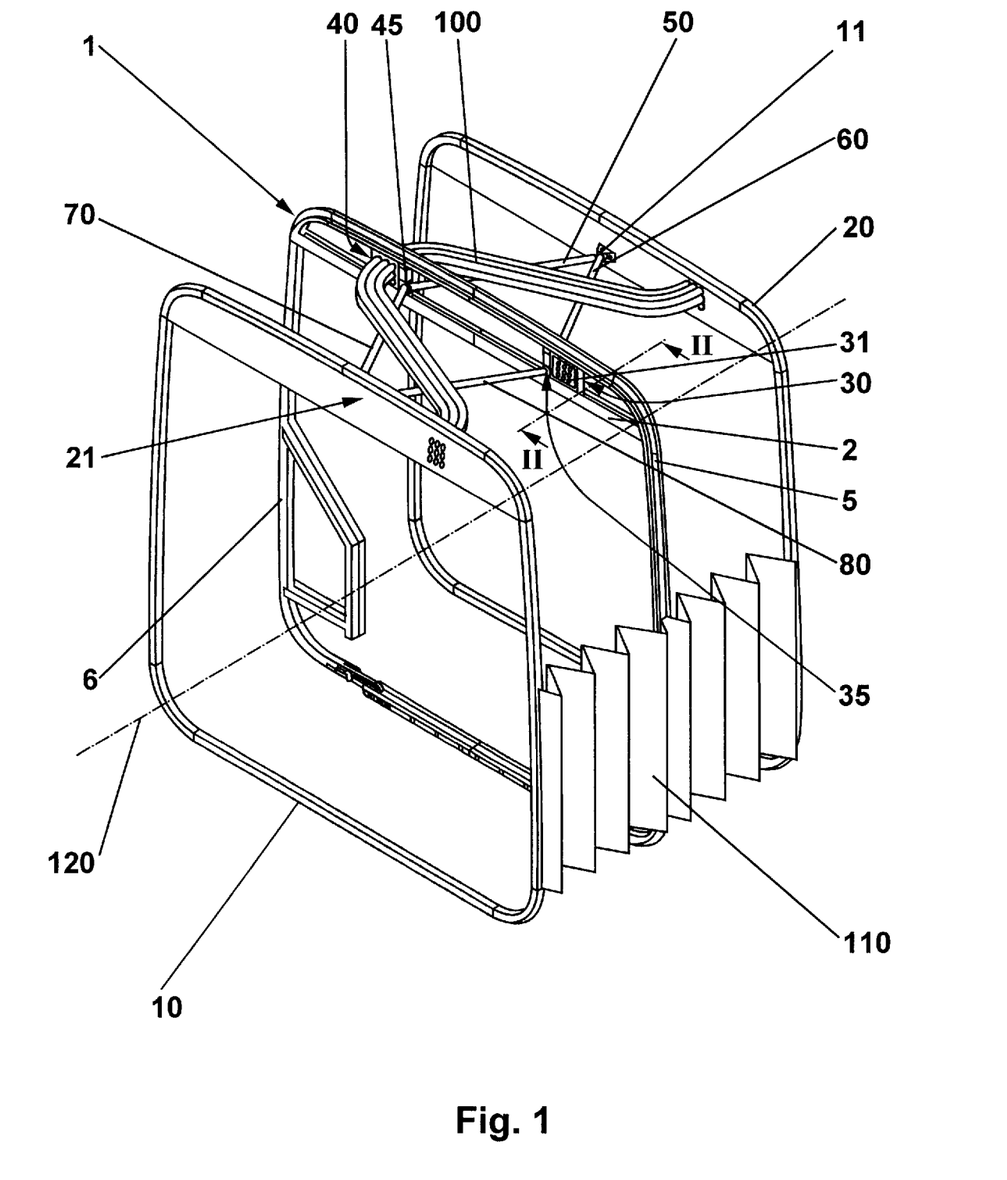
FIG. 1 is a diagram of a first device for guiding the supply lines in a perspective view.

According to FIG. 1, the central frame is referred to as a whole with numeral 1. The central frame 1 is part of a bellows or of a concertina walls not shown and connects the frames 10 and 20. The frames 10 and 20 are arranged each on the corresponding vehicle part of the articulated vehicle. The vehicle parts of the articulated vehicle are not shown either. The actual device for guiding the supply lines is located in the central frame 1. Therefore, the central frame 1 is provided in its roof area with a guiding rail referred to with numeral 2. This guiding rail 2 links together the two vertical braces 5 and 6 of the central frame 1. The guiding rail 2 receives two cradles 30, 40 being movable parallel to the longitudinal axis of the guiding rail. These two cradles 30, 40 are connected to the frames 10, 20 and thus to the corresponding vehicle parts by rods 50, 60 and 70, 80 respectively designed as guiding members. The connection is assured by swivel joints, whereas the swivel joint located on the frame 10, 20 is referred to with numeral 11, 21 and the swivel joint located on the cradle with numeral 35, 45. The rotation takes place on a vertical axis. It is important that the cradles 30, 40 are arranged eccentrically to the central longitudinal axis of the vehicle in the central frame and that the rods 50–80 are coupled in the central longitudinal axis of the vehicle. The coupling of the rods on the frames 10, 20 and on the cradles 30, 40 is articulated so that the cradles 30, 40 can be moved along the guiding rail 2, when so required by the traveling motion between the two vehicle parts. It has to be stressed that, thanks to the arrangement of the rods, which cannot be lengthened and to the arrangement of the cradles in the guiding rail, the cradles can never get into the area of the central longitudinal axis of the vehicle. The cradles always remain eccentric to the central longitudinal axis of the vehicle. The same is true for the arrangement of a cradle in the guiding rail.

The cradles themselves have openings 31, 41 for receiving the supply lines 100.

Figure 2:
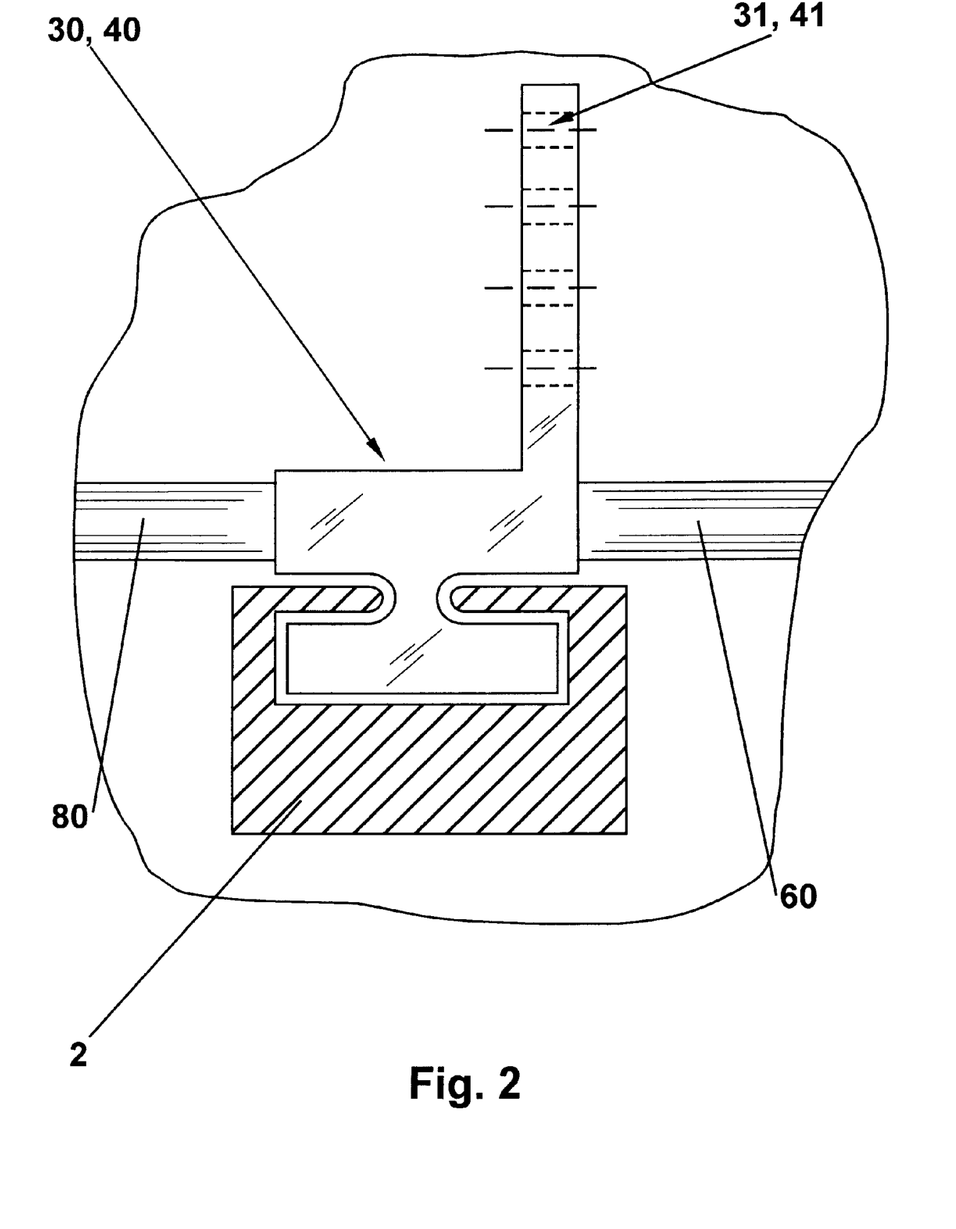
FIG. 2 is a section through the guiding rail with cradle.
Figure 3:
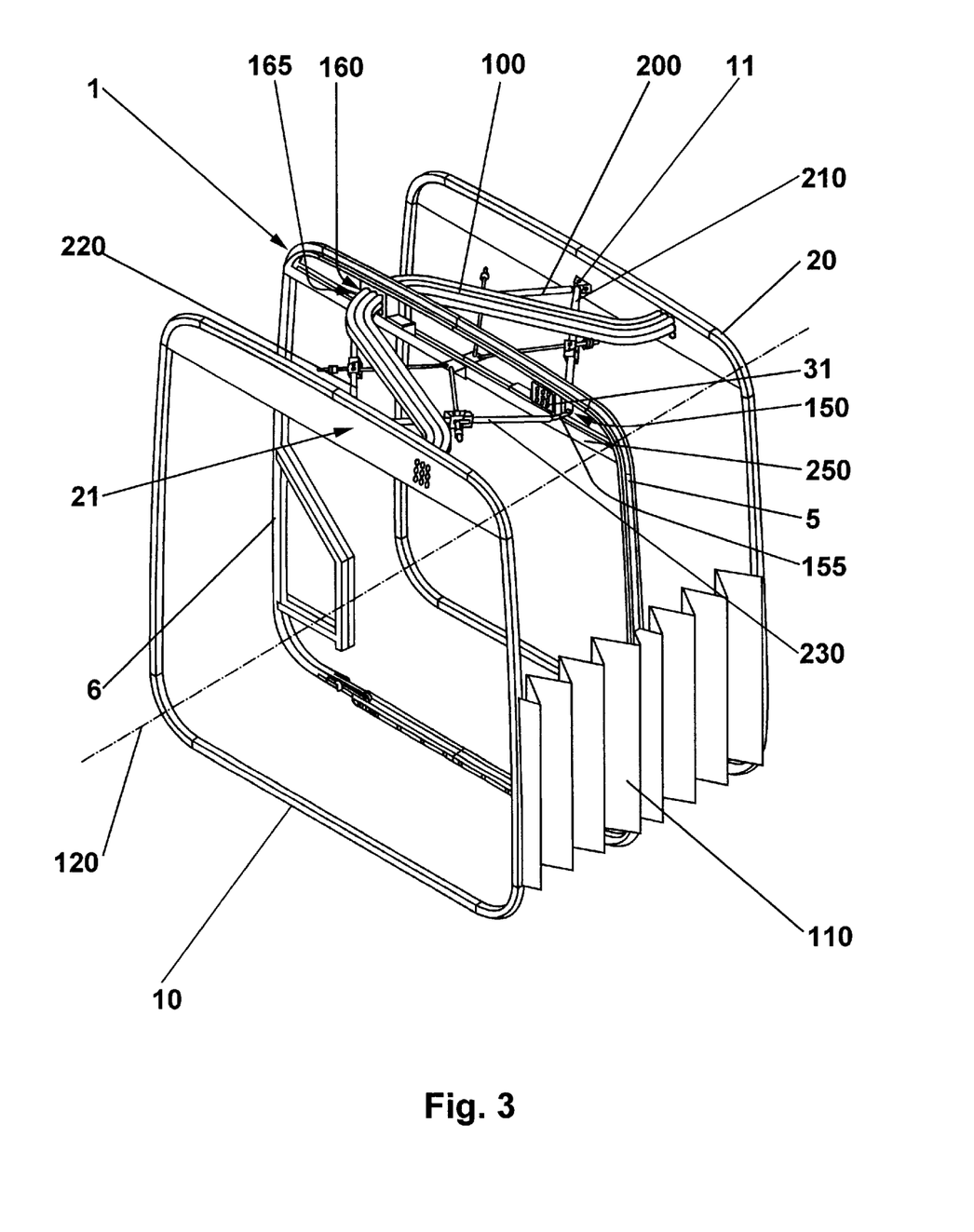
FIG. 3 is a second embodiment according to FIG. 1.

FIG. 2 shows the design of the guiding rail receiving the cradles. It can be seen in FIG. 2 that the cradle 30, 40 is movably positioned in the guiding rail 2 by a kind of dovetail guidance.

The second embodiment of a central frame stabilization can be seen in the FIGS. 3 to 6. According to FIG. 3, the cradles 150 and 160 are movably guided in the guiding rail referred to with numeral 250, whereas the cradles 150, 160 are provided with hinged guiding members 200 to 230, in analogy with the embodiment according to the FIGS. 1 and 2. These guiding members 200, 210, 220, 230 are not only hinged to the cradles 150, 160 at 155, 165, they are also hinged to the corresponding vehicle part 10, 20 at 11, 21. In this respect, the structural design is identical to the embodiment according to the FIGS. 1 and 2. The difference consists in the fact that each guiding member 200 to 230 has a joint 201, 211, 221, 231. Each joint has a stopper 202, 212, 222, 232; the stopper has been designed so that in the area where the joint divides into the two joint elements 201a, 201b or 211a, 211b or 221a, 221b or 231a, 231b it is provided with a bevel 205 to 235, so that the two joint elements are adjacent when the joint is stretches, i.e. when the two parts of the guiding member are positioned at an angle of approximately 180°. In order to guarantee that the guiding members 200, 210, 220, 230 are buckling during corresponding cornering, recuperating members 203, 213, 223, 233 are provided. The way these recuperating members are working is particularly evident in FIG. 5 where the guiding rail 250 and the corresponding guiding members are shown in dashes during cornering. The representation in solid lines shows the original position. The representation according to FIG. 5 clearly shows the function of the recuperating members 203, 213, 223, 233 which have to bring the respective guiding member from its dead center position to the buckling position. Therefore, each recuperating member is also hinged onto the guiding rail 250. Each recuperating member is advantageously adjustable in length; in the present case, this is achieved by providing the respective recuperating member at its end with a thread, the thread receiving a screw, whereas the screw predetermines the path taken by the recuperating member to reach the joint and to bring it to buckle.

Figure 4:
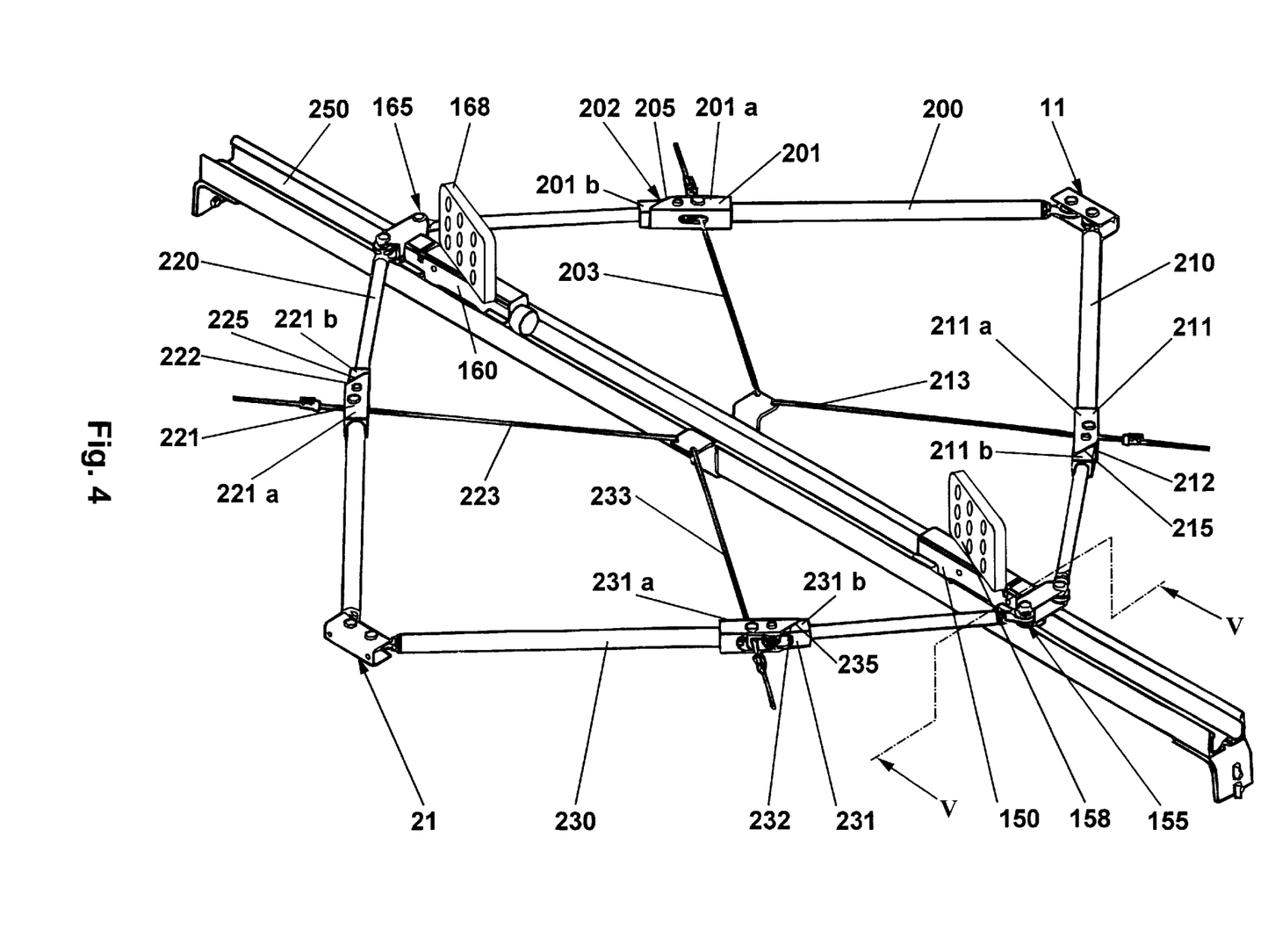
FIG. 4 is a perspective view of the guiding rail with the guiding members.
Figure 5:
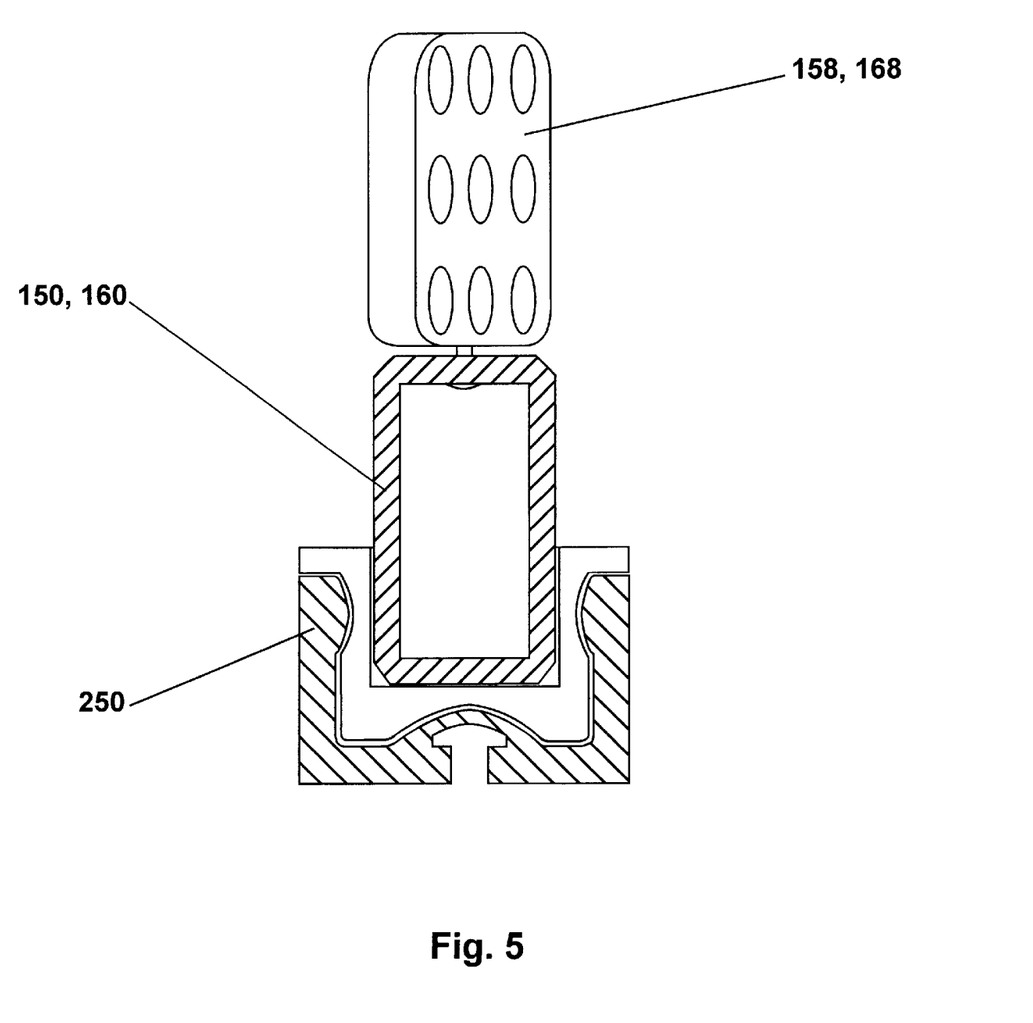
FIG. 5 is a section along the line VI—VI of FIG. 4.
Figure 6:
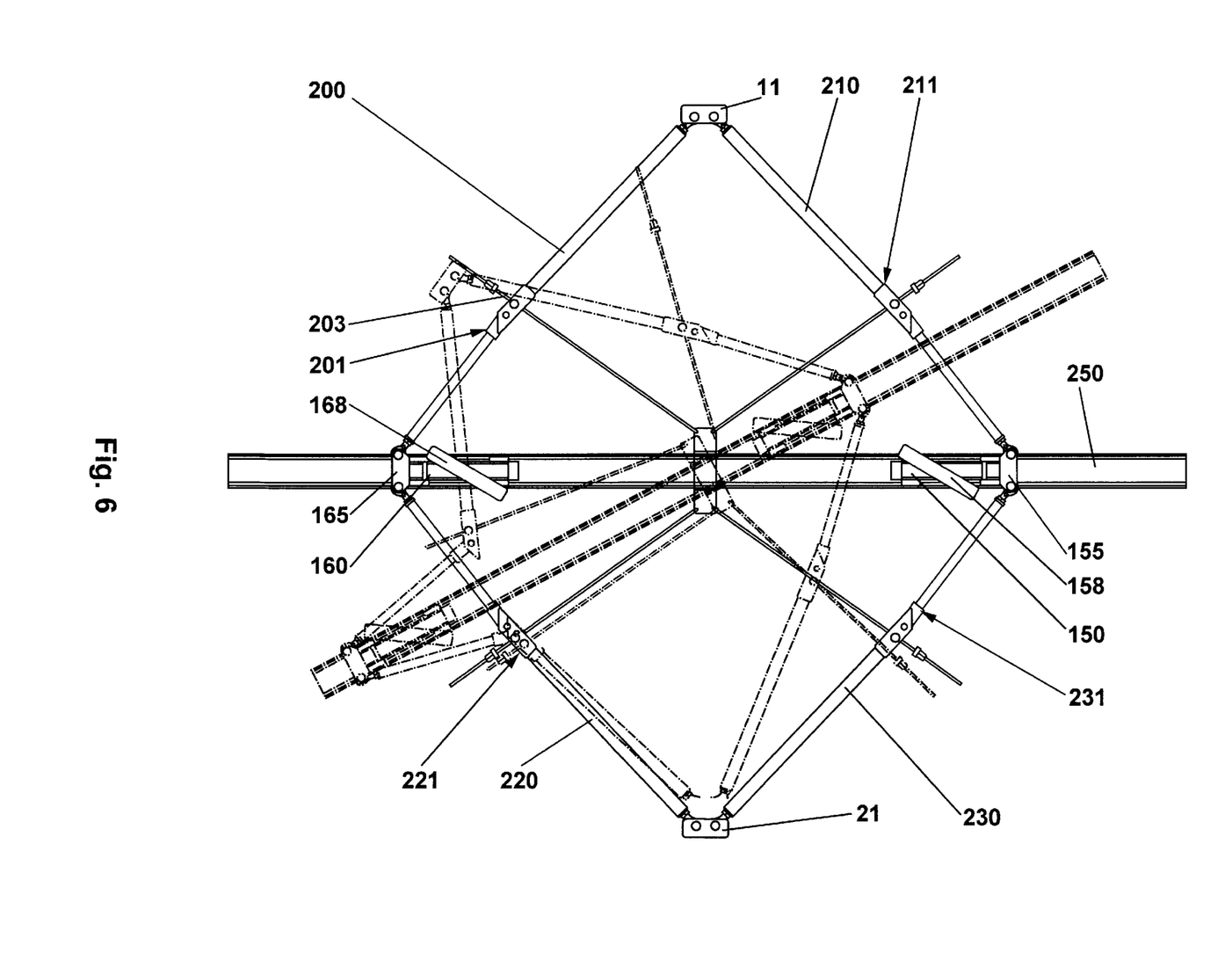
FIG. 6 shows the position of the guiding rail and of the guiding members during cornering.

The representation according to FIG. 5 is a section along the line VI—VI of FIG. 4. It shows clearly that the cradle 150, 160, is positioned in the guiding rail 250 by a kind of dovetail guidance, as was also the case in FIG. 2 of the first embodiment. Moreover, like in FIG. 4, carriers 158, 168 can also be seen in FIG. 5, the cradle 150, 160 is receiving these carriers which are rotatable around a vertical axis and through which the supply lines 100 are passed. To this purpose, the carriers 158, 168 are provided with corresponding openings.

Figure 7:
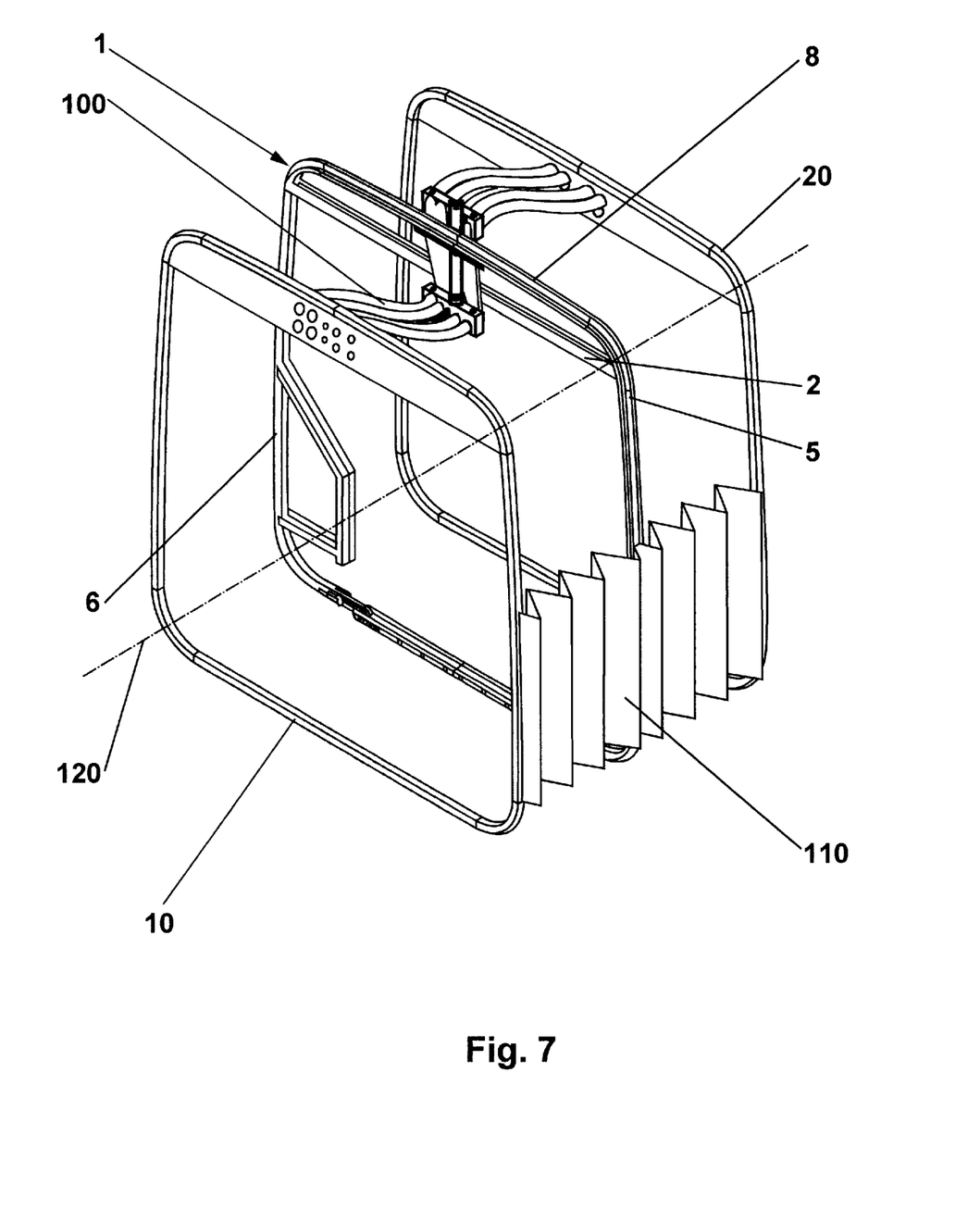
FIG. 7 is a second device for guiding the supply lines.
Figure 8:
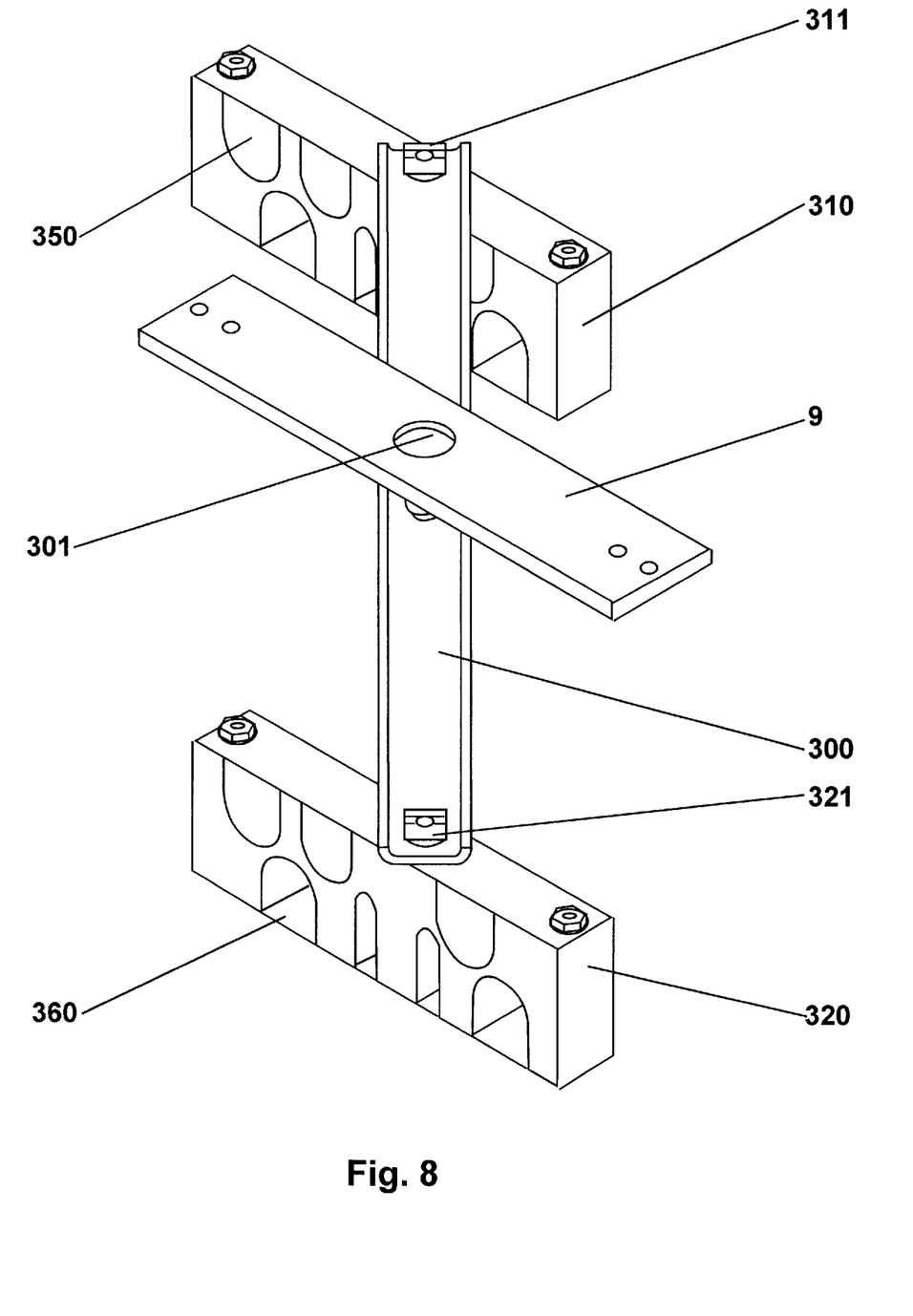
FIG. 8 is an enlargement of the device according to FIG. 7.

In the device according to the FIGS. 7 and 8, the swivel arm 300 is rotatably hinged onto the bar 8 of the central frame 1 in the middle of the bow. The swivel arm 300 is provided at its ends with holding devices 310, 320 having corresponding openings 350, 360 for receiving the supply lines 100. The swivel arm is hereby fastened onto the bar 8 by means of a vertical axis 301, so that the swivel arm is horizontally pivotable. The holding devices 310, 320 are also horizontally pivotable and are hinged onto the swivel arm by means of vertical axes too. The swivel arm 300 is fastened onto the bow 8 by means of a supporting plate 9.

During corresponding movement of the vehicle frames 10, 20 relative to the central frame 1, the swivel arm is moved like a parallelogram guiding rod together with the holding devices by the supply lines which are centrally receivable by the vehicle frames 10,

I claim:

1. Central frame (1) of a connector corridor bellows subdivided in two halves, the corridor being positioned between two vehicle parts hinged to each other, whereas the bellows halves are linked by their end part to a vehicle part (10,20);

characterized in that the central frame (1) located in the ceiling area of the connecting corridor is provided with at least one cradle (30, 40, 250, 160) for guiding supply lines (100) including conduits and cables, and said cradle being movably arranged in the central frame (1) transversely to the longitudinal axis of the vehicle.

2. Central frame according to claim 1, characterized in that the vertically running braces (5, 6) of the central frame (1) are interconnected by a guiding rail (2, 250) for the cradle (30, 40; 150, 160).

3. Central frame according to claim 2, characterized in that the guiding rail (2, 250) is provided with two cradles (30, 40, 150, 160) being arranged out of the central axis of the vehicle in the guiding rail (2, 250).

4. Central frame according to claim 3, characterized in that each cradle (30, 40; 150, 160) is linked to one vehicle part each by means of one guiding member (50, 60, 70, 80; 200, 210, 220, 230) per cradle.

5. Central frame according to claim 3, characterized in that the guiding rail (2; 250) receives the cradle (30, 40; 150, 160) form-fittingly but movably along the guiding rail (2; 250).

6. Central frame according to claim 1, characterized in that the cradle (30, 40; 150, 160) is restrictedly guided in the guiding rail (2, 250) parallel to the longitudinal axis of the guiding rail (2, 250).

7. Central frame according to claim 6, characterized in that the cradle (30, 40, 150, 160) is guided in the guiding rail (2, 250) eccentrically to the central longitudinal axis (120) of the vehicle.

8. Central frame according to claim 1, characterized in that the cradle (30, 40; 150, 160) is pivotally connected to at least one vehicle part (10, 20) by means of at least one guiding member (50, 60, 70, 80; 200, 210, 220, 230).

9. Central frame according to claim 8, characterized in that the pivotal connection of the guiding member or members (50 to 80; 200 to 230) to the vehicle part takes place in the central longitudinal axis (120) of the vehicle.

10. Central frame according to claim 9, characterized in that the guiding member (200, 210, 220, 230) is provided with a joint (201, 211, 221, 231).

11. Central frame according to claim 10, characterized in that the joint (201, 211, 221, 231) can be buckled inwards towards the guiding rail.

12. Central frame according to claim 10, characterized in that, in order to avoid outward buckling by an overstretched angle of more than 180°, the joint (201, 211, 221, 231) is provided with a corresponding stopper (202, 212, 222, 232).

13. Central frame according to claim 10, characterized in that a recuperating member (203, 213, 223, 233) is arranged in the area of the joint (201, 211, 221, 231) which is pivotably fastenable on the central frame (1).

14. Central frame according to claim 13, characterized in that the recuperating member (203, 213, 223, 233) is slewably arranged on the guiding rail (250).

15. Central frame according to claim 13 characterized in that the recuperating member (203, 213, 223, 233) is arranged on the guiding rail (250) in its central longitudinal axis.

16. Central frame according to claim 13, characterized in that the length of the recuperating member (203, 213, 223, 233) is adjustable.

17. Central frame according to claim 1, characterized in that the guiding member (50, 60, 70, 80; 200, 210, 220, 230) is advantageously designed as a rod, hinged to the vehicle part as well as to the cradle (30, 40; 150, 160).

18. Central frame according to claim 1, characterized in that the cradle (150, 160) is provided with a carrier (158, 168) which is pivotably receivable by the cradle.

19. Central frame according to claim 18, characterized in that the carrier (158, 168) is pivotable on a vertical axis.

20. Central frame according to claim 1, characterized in that the central frame (1) is provided with a horizontally running bar (8) that pivotably receives a swivel arm (300), whereas the swivel arm (300) has holding devices (310, 320) at its end.

21. Central frame according to claim 20, characterized in that the holding devices (310, 320) are pivotably receivable by the swivel arm (300).

22. Central frame according to claim 20, characterized in that the swivel arm (300) is arrangeable on the central frame (1) in the central longitudinal axis (120) of the vehicle.

23. Central frame according to claim 20, characterized in that the swivel arm (300) is pivotably arrangeable in the center of the bar (8).

24. Central frame according to claim 20, characterized in that the holding devices (310, 320) are provided with openings (30, 360) for the supply lines (100).

* * * * *

UNITED STATES PATENT AND TRADEMARK OFFICE
CERTIFICATE OF CORRECTION

PATENT NO.     : 6,076,470
DATED          : June 20, 2000
INVENTOR(S)    : Robert Koch Page 1 of 1

It is certified that error appears in the above-identified patent and that said Letters Patent is hereby corrected as shown below:

Column 1,
Line 4, "a com" should be -- a con --.

Column 3,
Line 16, "bow" should be -- bar --.

Column 4,
Line 45, "stretches" should be -- stretched --.

Column 5,
Lines 11 and 19, "bow" should be -- bar --.

Claim 3,
Line 1, "claim 2" should be -- claim 1 --.

Signed and Sealed this

Thirteenth Day of November, 2001

Attest:

*Nicholas P. Godici*

*Attesting Officer*

NICHOLAS P. GODICI
*Acting Director of the United States Patent and Trademark Office*